United States Patent
Cariello

(10) Patent No.: US 11,669,258 B2
(45) Date of Patent: Jun. 6, 2023

(54) DYNAMIC SUPERBLOCKS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/241,930

(22) Filed: Apr. 27, 2021

(65) Prior Publication Data

US 2022/0342544 A1 Oct. 27, 2022

(51) Int. Cl.
*G06F 3/06* (2006.01)

(52) U.S. Cl.
CPC ............ *G06F 3/064* (2013.01); *G06F 3/0604* (2013.01); *G06F 3/0659* (2013.01); *G06F 3/0679* (2013.01)

(58) Field of Classification Search
CPC ...... G06F 3/064; G06F 3/0604; G06F 3/0659; G06F 3/0679
See application file for complete search history.

(56) References Cited

U.S. PATENT DOCUMENTS

| | | | | |
|---|---|---|---|---|
| 8,966,205 B1 * | 2/2015 | Lo | ........................ | G06F 12/0246 711/165 |
| 9,846,554 B1 * | 12/2017 | Lai | ........................ | G06F 3/0604 |
| 10,553,290 B1 * | 2/2020 | Muchherla | ............. | G11C 29/52 |
| 2019/0196959 A1 * | 6/2019 | Ji | ............................ | G11C 29/44 |
| 2019/0310774 A1 * | 10/2019 | Oh | ........................ | G06F 12/0246 |
| 2020/0285393 A1 * | 9/2020 | Lin | ........................ | G06F 3/0604 |
| 2021/0042201 A1 * | 2/2021 | Byun | .................. | G06F 11/2094 |
| 2021/0303424 A1 * | 9/2021 | Jain | ........................ | G06F 3/068 |

\* cited by examiner

*Primary Examiner* — Francisco A Grullon
(74) *Attorney, Agent, or Firm* — Holland & Hart LLP

(57) ABSTRACT

Methods, systems, and devices for dynamic superblocks are described. In some examples, a superblock may be established across one or more dice of a memory device. A superblock may include one or more blocks from a plurality of planes of a memory die, and may be associated with a first performance cursor or a second performance cursor. The superblock may be established based on one or more criteria, such as a quantity of available blocks in a plane, a quantity of access operations performed on one or more blocks in a plane, or other criteria. Establishing a superblock associated with a first performance cursor may allow for performance criteria established by a host device to be maintained, while establishing a superblock associated with a second performance cursor may allow for garbage collection, wear leveling, and other maintenance operations to be performed on the memory device.

25 Claims, 8 Drawing Sheets

DYNAMIC SUPERBLOCKS

FIELD OF TECHNOLOGY

The following relates generally to one or more systems for memory and more specifically to dynamic superblocks.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
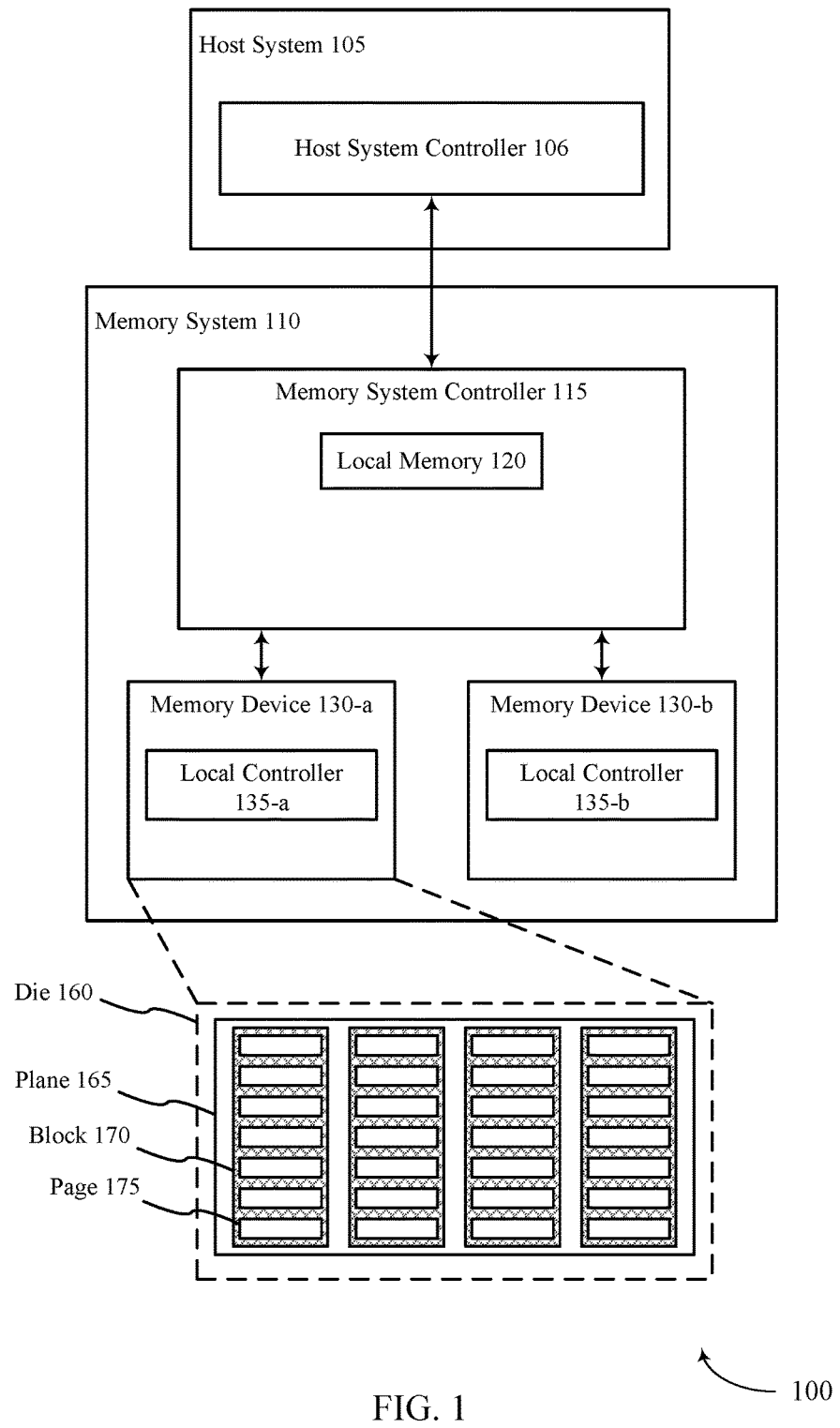
FIG. 1 illustrates an example of a system that supports dynamic superblocks in accordance with examples as disclosed herein.

A non-volatile memory device may include multiple die (e.g., multiple memory die) that each include one or more planes. Each plane may include one or more blocks, and each block may include one or more memory cells (e.g., one or more non-volatile memory cells, such as NAND memory cells). In a managed NAND (e.g., mNAND) device, the memory cells may be managed by a memory controller. Managed NAND (e.g., mNAND) devices may use multi-plane writes to achieve higher performance across one or more memory die. For example, a multi-plane write command may concurrently write data to memory cells across various planes of each memory die. In some examples, superblocks may be established for a managed NAND device during manufacturing. A superblock may include one or more blocks from multiple planes, which may improve performance during a multi-plane write operation. The managed NAND device may maintain a cursor to indicate the current write location for the superblock. However, due to defects in the memory, the number of superblocks that can be created may be limited as one or more planes may have larger quantities of bad blocks.

Techniques for generating and managing dynamic superblocks across multiple memory dice are described herein. In some examples, a controller (e.g., a mNAND controller) may be configured to generate and maintain various superblocks on one or more memory die. For example, a controller may take into account a quantity of available blocks in a plane and/or maintenance operations (e.g., garbage collection, wear leveling, etc.) being performed when generating a superblock. Thus, when opening a new cursor (e.g., when a superblock is accessed for the first time, or when switching from writing to a first block to a second block), the controller may build a superblock based on a quantity of available blocks across various planes, and may re-use blocks that are cleaned up due to garbage collection or other maintenance operations. The controller may also establish and maintain multiple cursors associated with different performance levels. For example, a first cursor (e.g., a fast cursor) that supports blocks in each plane of the memory may be maintained, as well as a slow cursor that supports blocks in less than all planes of the memory. The second cursor may be used for maintenance operations across planes, as planes that have fewer blocks, or more blocks with higher cycles, may be skipped. Accordingly, by establishing and maintaining dynamic superblocks associated with different performance levels, maintenance operations may be performed on some blocks without affecting the overall performance of the memory system.

Features of the disclosure are initially described in the context of systems as described with reference to FIGS. 1 through 2. Features of the disclosure are described in the context of a flow diagram and memory devices as described with reference to FIGS. 3-5. These and other features of the disclosure are further illustrated by and described with reference to an apparatus diagram and flowcharts that relate to dynamic superblocks as described with reference to FIGS. 6-8.

FIG. 1 illustrates an example of a system 100 that supports dynamic superblocks in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support dynamic superblocks. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system. For example, the memory system controller 115 may establish one or more superblocks on the memory die 160. As described herein, a superblock may include at least one block 170 from two or more planes of the memory die 160. In some examples, the superblock may be associated with a first cursor (e.g., a performance cursor) or a second cursor (e.g., a non-performance cursor).

To establish a superblock, the memory system controller 115 may determine a quantity of available blocks within each plane of the memory die 160 or determine a quantity of access operations performed on available blocks within each plane of the memory die 160. Based on the determination, the memory system controller 115 may select at least one block 170 from two or more planes of the memory die 160 to be included in the superblock. Accordingly, when the memory system controller 115 receives a command (e.g., a write command, a multi-plane write command), the memory system controller 115 may transmit a command and the data to the memory device 130-a. The command may indicate to write the data to the respective blocks of the superblock concurrently. By establishing and maintaining dynamic superblocks on the memory die 160, maintenance operations may be performed on some blocks 160 without affecting the overall performance of the memory system 110.

Figure 2:
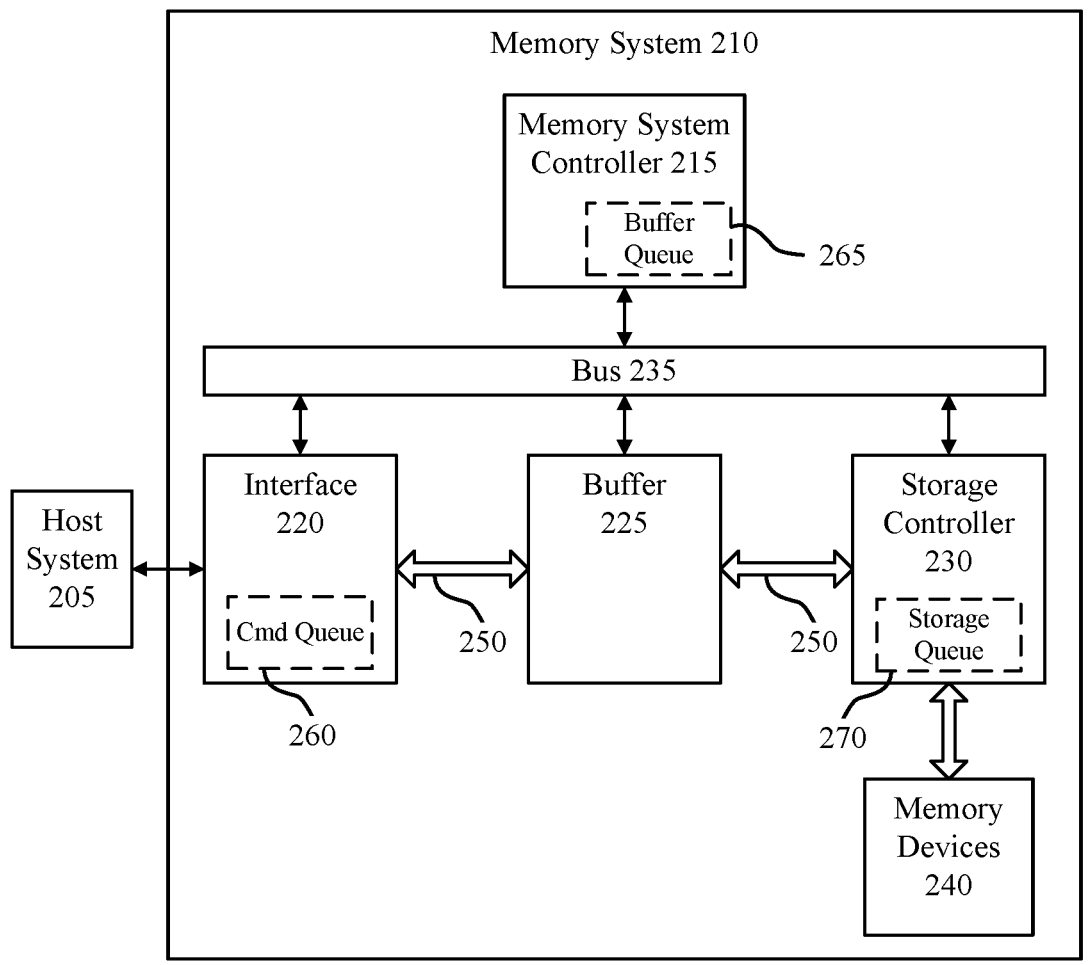
FIG. 2 illustrates an example of a system that supports dynamic superblocks in accordance with examples as disclosed herein.

FIG. 2 illustrates an example of a system 200 that supports dynamic superblocks in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 may establish one or more superblocks on one or more memory die of a memory device 240. As described herein, a superblock may include at least one block from two or more planes of the memory die, and may be associated with one or more performance levels. For example, the superblock may be associated with a first cursor (e.g., a performance cursor) or a second cursor (e.g., a non-performance cursor). Whether the superblock is associated with the first cursor or the second cursor may depend on performance criteria received from the host system 205.

To establish a superblock, the memory system controller 215 may determine a quantity of available blocks within each plane of the memory die of memory devices 240 or determine a quantity of access operations performed on available blocks within each plane of the memory die of memory devices 240. Based on the determination, the memory system controller 215 may select at least one block from two or more planes of the memory die to be included in the superblock. Accordingly, when the memory system controller 215 receives a command (e.g., a write command, a multi-plane write command), the memory system controller 215 may transmit a command and the data to the memory devices 240. The command may indicate to write the data to the respective blocks of the superblock concurrently.

Additionally or alternatively, the memory system controller 215 may receive performance criteria from the host system 205. For example, the memory system controller 215 may receive a sequential write command from the host system 205 and may establish a superblock associated with a first cursor (e.g., a performance cursor) based on receiving the sequential write command. In such examples, the superblock may consist of a single block from each plane of the memory die, and the data associated with the sequential write operation may be written to each block, with multi-plane writes being performed concurrently.

In other examples, the memory system controller 215 may not receive performance criteria from the host system 205, and may establish a superblock associated with a second cursor (e.g., a non-performance cursor). In such examples, the superblock may consist of a single block from each of a subset of the planes of the memory die (e.g., at least one plane may not include a block in the superblock), and the write operation may partially (or completely) fill each block. By establishing and maintaining dynamic superblocks on the memory dice of the memory devices 240, maintenance operations may be performed on some blocks, while still meeting performance requirements established by the host system 205.

Figure 3:
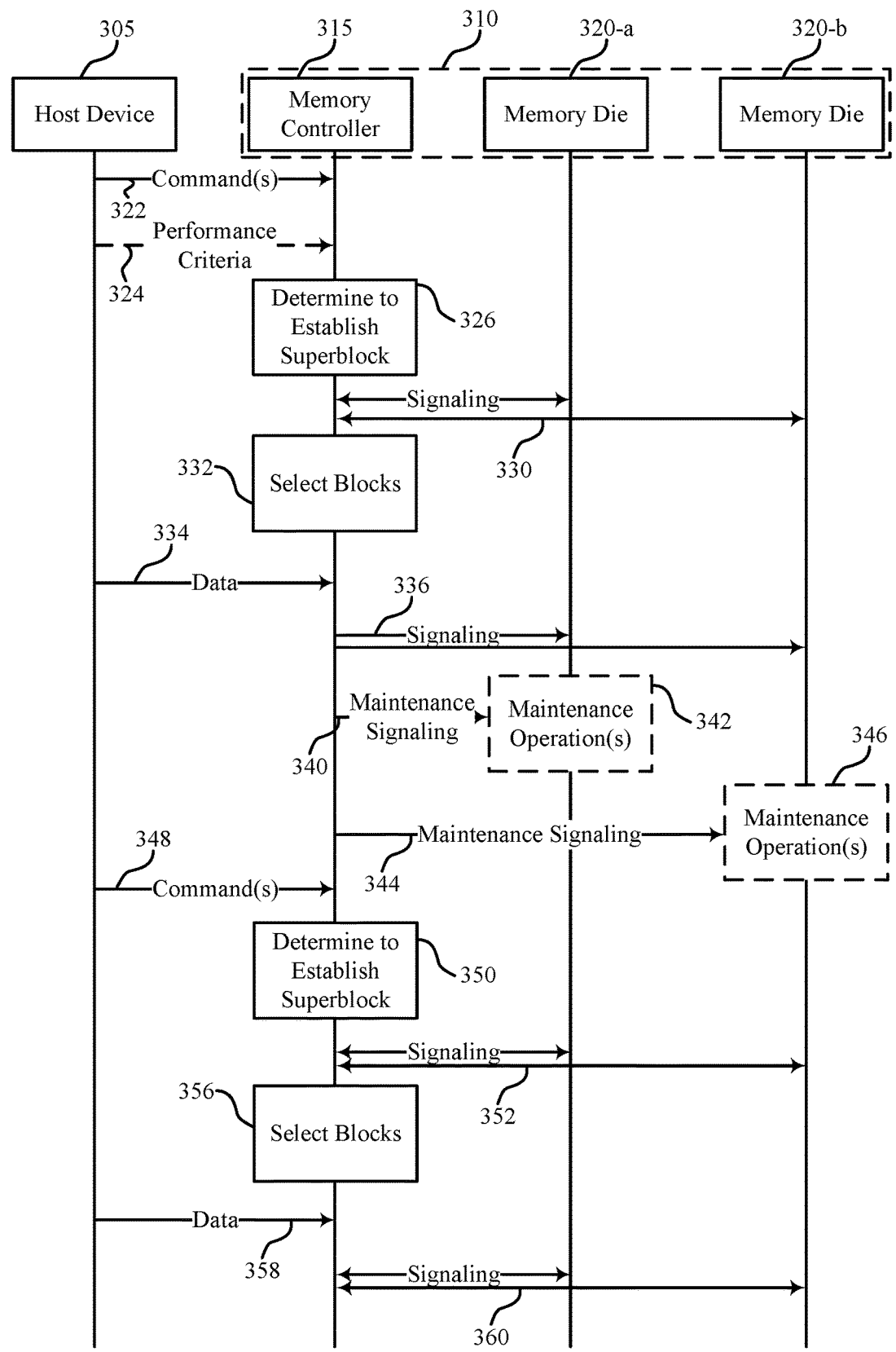
FIG. 3 illustrates an example of a process flow diagram that supports dynamic superblocks in accordance with examples as disclosed herein.

FIG. 3 illustrates an example of a process flow diagram 300 that supports dynamic superblocks in accordance with examples as disclosed herein. The process flow diagram 300 may illustrate the operations of a host device 305 and a memory device 310. The memory device 310 may be an example of a managed memory device (e.g., an mNAND memory device) and may include a memory controller 315, a memory die 320-a (e.g., a first memory die 320-a), and a memory die 320-b (e.g., a second memory die 320-b). In some examples, the memory device 310 may include any quantity of memory dice 320. The process flow diagram 300 may illustrate dynamically establishing and maintaining superblocks, which may allow the memory device 310 to perform maintenance operations on some memory dice 320 (e.g., some blocks of some memory dice 320) while meeting performance criteria established by the host device 305.

As shown in process flow diagram 300, the memory controller 315 may receive one or more commands 322 from the host device 305. In some examples, the command(s) 322 may include read commands, write commands, or other commands, and may include or be associated with data also received from the host device 305 (e.g., for a write command). The memory controller 315 may buffer the data (e.g., in a buffer 225).

The memory controller 315 may receive performance criteria 324 associated with the command(s) 322. For example, the performance criteria 324 may indicate support of sequential write commands (e.g., commands 322). In other examples, the performance criteria 324 may indicate a rate for data to be written to the memory device 310, or another type of criteria which may be used for selecting a first cursor (e.g., a fast cursor, a performance cursor) when establishing a new superblock. The performance criteria may be transmitted from the host device 305 to the memory device 310 (e.g., to the memory controller 315) with the command(s) 322 or separate from the command(s) 322 (e.g., prior to command(s) 322).

At 326, the memory controller 315 may determine to establish a superblock. In some examples, determining to establish a superblock may include or may be associated with opening a new cursor. As described herein, a cursor may refer to a location to write data received form the host device 305. Moreover, a superblock may refer to a logical grouping of blocks, managed by firmware (e.g., firmware of the memory controller 315), in one or more memory dice 320. For example, a superblock may include at least one block from at least two planes from the planes included in the memory die 320-a, the memory die 320-b, or both. Thus when data is received from the host device 305 (e.g., data associated with a write), the memory controller 315 may write the data to the blocks included in the superblock concurrently (e.g., using a multi-plane write). In some examples, blocks may be selected for a superblock based on various criteria as discussed below.

The memory controller 315 may manage superblocks according to a first cursor (e.g., a fast cursor, a performance cursor) or a second cursor (e.g., a non-performance cursor). Whether the memory controller 315 manages a superblock according to the first cursor or the second cursor may depend on whether any performance criteria was received from the host device 305. For example, if the host device 305 indicated a sequential write command for the data 334, then the memory controller 315 may determine to establish a superblock according to a first cursor. Additionally or alternatively, if the host device 305 did not indicate any performance criteria, then the memory controller 315 may determine to establish a superblock according to a second cursor. The memory controller 315 may maintain multiple active cursors (e.g., one performance cursor and one non-performance cursor).

In some examples, the memory controller 315 may determine to establish a superblock (e.g., at 326) based on a quantity of available blocks within each plane of the memory die 320-a, the memory die 320-b, or both. For example, the memory controller 315 may select a block (e.g., for the superblock) within a plane if the plane includes a threshold quantity of available blocks. An available block may refer to any block that is not bad or populated with data (e.g., contains no valid data, or erased). If a plane does not include a threshold quantity of available blocks, the memory controller 315 may refrain from selecting a block from that particular plane for the superblock until one or more maintenance operations, such as garbage collection operations, are performed on the blocks of the plane. Once maintenance operations are performed on the blocks of the plane, and the plane includes the threshold quantity of available blocks, the blocks may be included in subsequently generated superblocks.

In other examples, the memory controller 315 may determine to establish a superblock (e.g., at 326) based on a quantity of access operations performed on available blocks within each plane of the memory die 320-a, the memory die 320-b, or both. For example, the memory controller 315 may select a block (e.g., for the superblock) within a plane if the quantity of access operations performed on the block satisfies a threshold value. The quantity of access operations may reflect a quantity of certain access operations such as program operations, and erase operations, and may exclude one or more access operations such as read operations, which may not cause cell degradation. Alternatively, access operations may be associated with weighting factors, and the quantity of access operations may be a weighted quantity (e.g., program or erase operations may be weighted more highly than read operations). If the quantity of access operations performed on a particular block does not satisfy the threshold value (e.g., if the block has been used more than other blocks), the memory controller 315 may refrain from selecting the block for the superblock until one or more maintenance operations, such as wear leveling operations, are performed on blocks of the memory die 320. Once maintenance operations are performed on block (or blocks), and the quantity of access operations performed on the block satisfies the threshold value of access operations (e.g., relative to other blocks), the block may be included in subsequently generated superblocks.

The memory controller 315 may transmit signaling 330 to the memory die 320-a and the memory die 320-b. In some examples, the signaling 330 may be transmitted by the memory controller 315 sequentially or concurrently and may be in response to determining to establish a superblock (e.g., at 326). The signaling 330 may include a command (e.g., a read command, a write command), a request, or another type of communication for determining a quantity of available blocks within each plane of the memory die 320-a, the memory die 320-b, or both or for determining a quantity of access operations performed on available blocks within each plane of the memory die 320-a, the memory die 320-b, or both. Signaling 330 may be returned from the memory die 320-a, the memory die 320-b, or both to indicate (e.g., to the memory controller 315) the quantity of access operations performed on available blocks of the memory dice 320 or the quantity of available blocks of each memory die 320. In some examples, signaling 330 may be omitted and the information (e.g., quantity of available blocks, quantity of access operations performed on available blocks within each plane of the memory die 320) may be maintained by memory controller 315.

At 332, the memory controller 315 may select blocks to be included in the superblock. The memory controller 315 may select the blocks based on the signaling 330 between the memory controller 315 and the memory die 320-*a* and the memory die 320-*b*, and whether any performance criteria was received from the host device 305. In some examples, the memory controller 315 may select blocks from planes that include a threshold quantity of available blocks and/or blocks that satisfy a threshold quantity of access operations (e.g., have less than the threshold quantity of access operations). Additionally or alternatively, the quantity of blocks selected for the superblock may be based on whether any performance criteria was received from the host device 305. That is, if performance criteria was received, the memory controller 315 may select a block from each plane of the memory die 320-*a* and/or the memory die 320-*b* for the superblock. In other examples, if performance criteria was not received, the memory controller 315 may select a lesser quantity of blocks for the superblock (e.g., one block from each of a subset of planes of the memory die 320-*a* and the memory die 320-*b*).

Figure 4:
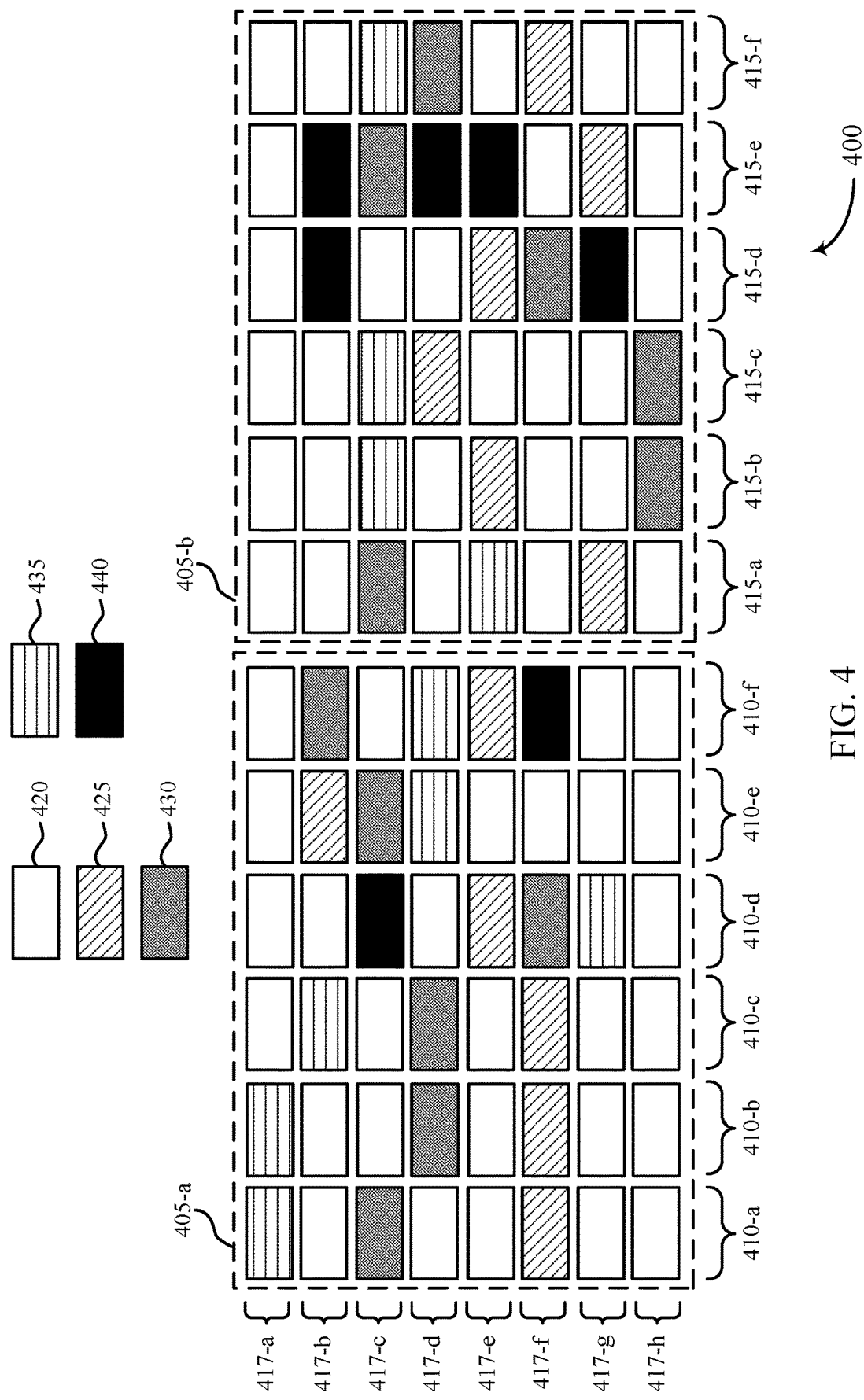
FIG. 4 illustrates an example of a memory device that supports dynamic superblocks in accordance with examples as disclosed herein.

As a first example, and described with reference to FIG. 4, the memory controller 315 may receive an indication of a sequential write operation (e.g., in performance criteria 324) from the host device 305. FIG. 4 illustrates an example of a memory device 400 that supports dynamic superblocks in accordance with examples as disclosed herein. The memory device 400 may include memory die 405-*a* (e.g., a first memory die 405-*a*) and memory die 405-*b* (e.g., a second memory die 405-*b*). In some examples, the memory die 320-*a* may include one or more planes 410 that each include one or more blocks, and the memory die 405-*b* may include one or more planes 415 that each include one or more blocks. Moreover, each block of the memory die 405-*a* and each block of the memory die 405-*b* may be located within a row 417. The memory device 400 may illustrate one or more superblocks that are dynamically established, which may allow the memory device 400 to perform maintenance operations on some memory dice 405 (e.g., some blocks of some memory dice 405) while meeting performance criteria established by a host device. Memory die 405-*a* and 405-*b* may correspond to memory die 320-*a* and 320-*b*, respectively.

As shown in FIG. 4, the memory device 400 may include a first memory die 405-*a* that includes planes 410-*a* through planes 410-*f*. Although six (6) planes are illustrated, the first memory die 405-*a* may include any quantity of planes. Each plane of the first memory die 405-*a* may include a plurality of blocks. For simplicity, each plane is illustrated as including eight (8) blocks that are associated with rows 417-*a* through 417-*h*. Although eight (8) blocks are illustrated, the first memory die 405-*a* may include any quantity of blocks including tens, hundreds, or thousands of blocks. Each block may include one or more pages (e.g., one or more pages of data), and may be configured to store a quantity of data, such as 16 KB of data.

In some examples, the blocks in the planes of the first memory die 405-*a* and the second memory die 405-*b* may be available, may be included in a particular superblock, may be associated with a maintenance operation, or may be bad blocks. For example, blocks 420 may be available, blocks 425 may be associated with a maintenance operation, blocks 430 may be associated with a first superblock, blocks 435 may be associated with a second superblock, and blocks 440 may be bad blocks.

Accordingly, as described with reference to FIG. 4, the memory controller 315 may determine to establish a superblock (e.g., at 326) according to a first cursor. Superblocks associated with a first cursor may include a block 435 from each plane of the respective memory die 405. As described herein, the blocks 420 may be available for use in a superblock. In some examples, the blocks may be available due to type and/or quantity of data stored to the respective blocks, due to a quantity of access operations performed on the respective blocks, or due to having recently undergone a maintenance operation (e.g., a garbage collection operation). For example, blocks that do not include any stored data (or include a relatively low quantity of stored data), blocks that have not undergone a relatively large quantity of access operations, or blocks that are available due to old or invalid data having recently been removed during garbage collection may be available for use in a superblock. For exemplary purposes, the blocks 420 may be available for use in a subsequent superblock, such as a superblock illustrated with reference to FIG. 5.

In some examples, the blocks 440 may not be available for use in a superblock. The blocks 440 may have gone bad during a manufacturing or other process, thus rendering them unavailable for storage. However, as described herein, other blocks in a same plane as a bad block 440 may be available for use in a superblock, thus not overly limiting the quantity of superblocks a memory controller can establish.

Thus, for exemplary purposes, the superblock may include a block 435 from each plane of the memory die 405-*a* and from each plane of the memory die 405-*b*. In some examples, each memory die 405 may include six (6) planes, though the memory dice 405 may include any quantity of planes.

Additionally or alternatively, the memory controller 315 may determine that each plane of each memory die 405 includes a threshold quantity of available blocks and/or the blocks 435 selected for the superblock are associated with a threshold quantity of access operations. In some instances, if one or more planes of a memory die 405 do not include a threshold quantity of available blocks, or if certain blocks are not associated with a threshold quantity of access operations, one or more maintenance operations may be performed before establishing the superblock.

The blocks 430 may be included in a first superblock associated with a first cursor (e.g., a performance cursor). As described herein, a superblock may be associated with a performance cursor based on one or more performance criteria received from a host device. Moreover, a superblock associated with a performance cursor may include one block from each plane in one or more memory die 405. For example, a first superblock may include the blocks 430 listed in Table 1.

TABLE 1

| Plane | Row |
|-------|-----|
| 410-a | 417-c |
| 410-b | 417-d |
| 410-c | 417-d |
| 410-d | 417-f |
| 410-e | 417-c |
| 410-f | 417-b |
| 415-a | 417-c |
| 415-b | 417-h |
| 415-c | 417-h |
| 415-d | 417-f |
| 415-e | 417-c |
| 415-f | 417-d |

As a second example, and described with reference to FIG. 4, the memory controller 315 may not receive performance criteria 324 from the host device 305. Accordingly, the memory controller 315 may determine to establish a superblock (e.g., at 326) according to a second cursor. Superblocks associated with a second cursor may include a block 435 from each of a subset of the planes of the memory dice 405. That is, for exemplary purposes, the superblock may include a quantity of blocks 435 that is less than a total quantity of planes included in the memory die 405-a and the memory die 405-b. In some examples, each memory die 405 may include six (6) planes, though the memory dice 405 may include any quantity of planes.

In selecting the blocks 435 for the superblock, the memory controller 315 may determine some planes do not include a threshold quantity of available blocks and/or the blocks 430 selected for the superblock do not satisfy a threshold quantity of access operations. For example, the memory controller 315 may refrain from selecting a block from the plane 415-d and the plane 415-e due to the planes not including a threshold quantity of available blocks, or due to the available blocks not satisfying a threshold quantity of access operations (e.g., having over the threshold quantity of access operations). In some instances, if one or more planes of a memory die 405 do not satisfy a threshold quantity of available blocks, or if certain blocks do not satisfy a threshold quantity of access operations, one or more maintenance operations may be performed before establishing a subsequent superblock.

The blocks 435 may be included in a second superblock associated with a second cursor (e.g., a non-performance cursor). As described herein, a superblock that is not associated with a performance cursor may include one block from a subset of the planes from one or more memory die 405. For example, a second superblock may include the blocks 435 listed in Table 2.

TABLE 2

| Plane | Row |
|---|---|
| 410-a | 417-a |
| 410-b | 417-a |
| 410-c | 417-b |
| 410-d | 417-g |
| 410-e | 417-d |
| 410-f | 417-d |
| 415-a | 417-e |
| 415-b | 417-c |
| 415-c | 417-c |
| 415-d | NONE |
| 415-e | NONE |
| 415-f | 417-c |

Thus, as shown in Table 2, the second superblock may not include any blocks in the plane 415-d or the plane 415-e. Accordingly, when a write command is received from a host device, data may be written to each of the blocks of the second superblock concurrently. In some examples, the quantity of data to be written to the blocks of the second superblock may be relatively small such that each block is not fully populated with data. This may allow for relatively small write operations to occur, followed by periods when the memory device 400 is idle or when a cache (e.g., a cache associated with the memory device 400) is syncing. Moreover, the superblocks associated with the second cursor may allow for some planes to be skipped (e.g., planes 415-d and 415-e) so that wear leveling or other maintenance operations can be performed.

When a superblock is established, the host device 305 may transmit data 334 to the memory device 310. The memory controller 315 may buffer the data. The memory controller 315 may transmit signaling 336 to the memory die 320-a and the memory die 320-b. In some examples, the signaling 336 may be transmitted by the memory controller 315 sequentially or concurrently and may be in response to receiving data 334 from the host device 305. The signaling 336 may include a command (e.g., a read command, a write command), a request, or another type of communication for writing data to the superblock.

In response to receiving the data, the data may be written to each of the blocks of the first superblock concurrently. In some examples, data may be written to the blocks such that each block is fully populated with data. For example, multiple write commands may be received from the host device and multiple write operations (e.g., multiple multi-plane write operations) may be performed on each of the blocks of the first superblock. After a quantity of write operations (e.g., a quantity greater than or equal to one (1)), the blocks of the superblock may be full. When the blocks of the superblock are full (e.g., fully populated), the memory controller may open a new cursor that corresponds to a new superblock. In some examples, maintenance operations may be performed one or more blocks of the first superblock after a new cursor (and subsequent superblock) is opened.

For example, the signaling 336 may include a write command for writing data to the superblock associated with the memory die 320-a and the memory die 320-b. Thus if the superblock is associated with a first cursor, the data may be written to each block concurrently such that pages of each block are written with portions of the data. In other examples, if the superblock is associated with a second cursor, a lesser quantity of data may be received, and written to the blocks of the superblock concurrently, such that each block receives a portion of the data. In either example (e.g., whether the superblock is associated with a first cursor or a second cursor), the data may be written evenly across each block of the superblock (e.g., a same number of pages may be written in each block).

The memory controller 315 may transmit maintenance signaling 340 to the memory die 320-a. The maintenance signaling 340 may initiate one or more maintenance operations that are performed at 342. Similarly, the memory controller 315 may transmit maintenance signaling 344 to the memory die 320-b that initiates one or more maintenance operations that are performed at 346. In some examples, maintenance operations may be performed on the memory die 320-a and the memory die 320-b at any time, and thus are illustrated as occurring after data is written to the memory die 320-a and the memory die 320-b for exemplary purposes only.

In some examples, the blocks 425 may be subject to or undergoing a maintenance operation. As described herein, maintenance operations such as wear leveling operations, background refresh operations, garbage collection operations, scrub operations, block scans, health monitoring operations, or others, or any combination thereof may be performed on the blocks 425. In some examples, maintenance operations may be performed on blocks that include cold or invalid data, or on blocks that are associated with a relatively high quantity of access operations (e.g., on blocks that do not include a threshold quantity of access operations). Performing the maintenance operations may result in the associated blocks being available for inclusion in a subsequent superblock. For exemplary purposes, some of the blocks 425 illustrated as subject to or undergoing a maintenance operation as described with reference to FIG. 4 may be available for and/or included in a superblock as described with reference to FIG. 5.

The maintenance operations performed on the memory die 320-*a* and the memory die 320-*b* may include operations such as wear leveling operations, background refresh operations, garbage collection operations, scrub operations, block scans, health monitoring operations, or others, or any combination thereof. In some examples, maintenance operations may be performed on blocks that include old or invalid data, or on blocks that are associated with a relatively low quantity of access operations (e.g., on blocks that satisfy a threshold quantity of access operations). Performing the maintenance operations may result in the associated blocks being available for inclusion in a subsequent superblock. For exemplary purposes, and described with reference to FIG. 4, the memory controller 315 may perform maintenance operations on the blocks 425, thus resulting in the blocks 425 being available for inclusion in a subsequent superblock.

In some examples, the memory controller 315 may initiate one or more maintenance operations on the memory die 320-*a* or the memory die 320-*b* based on a quantity of valid data written to a respective block. For example, the memory controller 315 may initiate a garbage collection operation on a block that includes a relatively small quantity of valid data (e.g., as opposed to a block having a relatively large quantity of valid data). This type of garbage collection operation (e.g., "greedy" garbage collection) may consume less time than garbage collection operations performed on blocks having relatively large quantities of valid data, which may improve the overall efficiency of the memory device 310.

The memory controller 315 may receive one or more additional commands 348 from the host device 305. In some examples, the command(s) may include read commands, write commands, or other commands. For example, the command(s) 348 may include a sequential write command.

At 350, the memory controller 315 may determine to establish a second superblock. In some examples, determining to establish a superblock may include or may be associated with opening a new cursor. In some examples, the cursor may be opened in response to data being written to the superblock via signaling 336. As described herein, the memory controller 315 may manage the second superblock according to the first cursor (e.g., a fast cursor, a performance cursor) or the second cursor (e.g., a non-performance cursor). Moreover, the memory controller 315 may determine to establish the second superblock (e.g., at 350) based on a quantity of available blocks within each plane of the memory die 320-*a*, the memory die 320-*b*, or both or based on a quantity of access operations performed on available blocks within each plane of the memory die 320-*a*, the memory die 320-*b*, or both. Thus, the second superblock may include blocks that were previously unavailable and became available due to the maintenance operation(s) performed at 342 and 346.

The memory controller 315 may transmit signaling 352 to the memory die 320-*a* and the memory die 320-*b*. In some examples, the signaling 352 may be transmitted by the memory controller 315 sequentially or concurrently and may be in response to determining to establish a second superblock (e.g., at 350). The signaling 352 may include a command (e.g., a read command, a write command), a request, or another type of communication for determining a quantity of available blocks within each plane of the memory die 320-*a*, the memory die 320-*b*, or both or for determining a quantity of access operations performed on available blocks within each plane of the memory die 320-*a*, the memory die 320-*b*, or both. Signaling may be returned from the memory die 320-*a*, the memory die 320-*b*, or both to indicate (e.g., to the memory controller 315) the quantity of access operations performed on available blocks of the memory dice 320 or the quantity of available blocks of each memory die 320. In some examples, signaling 352 may be omitted and the information (e.g., quantity of available blocks, quantity of access operations performed on available blocks within each plane of the memory die 320) may be maintained by memory controller 315 (e.g., may have been previously read from a different location in memory die 320-*a*, memory die 320-*b*, or a different memory die 320).

At 356, the memory controller 315 may select blocks to be included in the second superblock. The memory controller 315 may select the blocks based on the signaling 352 communicated with the memory die 320-*a* and the memory die 320-*b*, and whether any performance criteria was received from the host device 305. In some examples, the memory controller 315 may select blocks from planes that satisfy a threshold quantity of available blocks and/or blocks that satisfy a threshold quantity of access operations. Additionally or alternatively, the quantity of blocks selected for the superblock may be based on whether any performance criteria was received from the host device 305.

Figure 5:
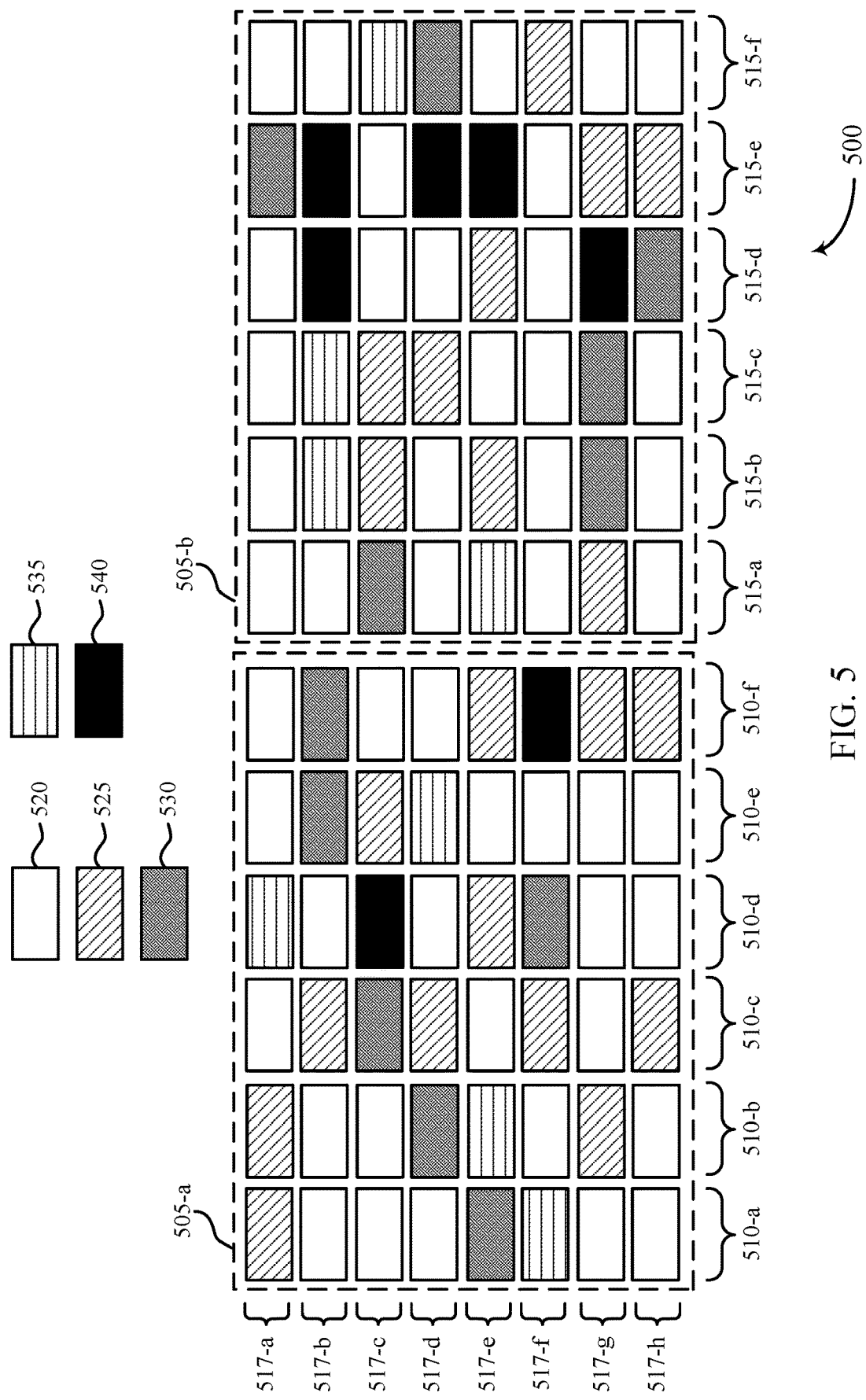
FIG. 5 illustrates an example of a memory device that supports dynamic superblocks in accordance with examples as disclosed herein.

By way of example, and described with reference to FIG. 5, the memory controller 315 may not receive performance criteria from the host device 305. FIG. 5 illustrates an example of a memory device 500 that supports dynamic superblocks in accordance with examples as disclosed herein. The memory device 500 may include memory die 505-*a* (e.g., a first memory die 505-*a*) and memory die 505-*b* (e.g., a second memory die 505-*b*), and may illustrate memory device 400 after maintenance operations performed at 342 and at 346 and selection of blocks for the second superblock at 356 (e.g., memory die 505-*a* may correspond to memory die 405-*a* and memory die 505-*b* may correspond to memory die 405-*b*).

As shown in FIG. 5, the memory device 500 may include a first memory die 505-*a* that includes planes 510-*a* through planes 510-*f*. Although six (6) planes are illustrated, the first memory die 505-*a* may include any quantity of planes. Each plane of the first memory die 505-*a* may include a plurality of blocks. For example, each plane may include eight (8) blocks that are associated with rows 517-*a* through 517-*h*. Although eight (8) blocks are illustrated, the first memory die 505-*a* may include any quantity of blocks. Each block may include one or more pages (e.g., one or more pages of data), and may be configured to store a quantity of data, such as 16 KB of data.

In some examples, the blocks in the planes of the first memory die 505-*a* and the second memory die 505-*b* may be available, may be included in a particular superblock, may be associated with a maintenance operation, or may be bad blocks. For example, blocks 520 may be available, blocks 525 may be associated with a maintenance operation, blocks 530 may be associated with a first superblock, blocks 535 may be associated with a second superblock, and blocks 540 may be bad blocks. In some examples, the memory device 500 may be an example of the memory device 400 as described with reference to FIG. 4, but having undergone one or more maintenance operations. Moreover FIG. 5 may illustrate new superblocks being established after the maintenance operations were performed.

As described herein, the blocks 520 may be available for use in a superblock. In some examples, the blocks may be available due to type and/or quantity of data stored to the respective blocks, due to a quantity of access operations performed on the respective blocks, or due to having recently undergone a maintenance operation (e.g., a garbage collection operation). For example, blocks that do not include any stored data (or include a relatively low quantity of stored data), blocks that have not undergone a relatively large quantity of access operations, or blocks that are available due to old or invalid having recently been removed during garbage collection may be available for use in a superblock. For exemplary purposes, the blocks 520 may be available for use in a subsequent superblock.

In some examples, the blocks 540 may not be available for use in a superblock. The blocks 540 may have gone bad during a manufacturing or other process, thus rendering them unavailable for storage. However, as described herein, other blocks in a same plane as a bad block 540 may be available for use in a superblock, thus not overly limiting the quantity of superblocks a memory controller can establish.

As a first example, and described with reference to FIG. 5, the memory controller 315 may receive an indication of a sequential write operation from the host device 305 and may determine to establish a superblock (e.g., at 350) according to a first cursor. The blocks 530 may be included in a superblock associated with a first cursor (e.g., a performance cursor). As described herein, a superblock may be associated with a performance cursor based on one or more performance criteria received from a host device. Moreover, a superblock associated with a performance cursor may include one block from each plane in one or more memory die 505. For example, the superblock may include the blocks 530 listed in Table 1. Some of the blocks included in the superblock may have undergone a maintenance operation, and thus may not have been available blocks as illustrated with reference to FIG. 4.

TABLE 1

| Plane | Row |
|-------|-------|
| 510-a | 517-e |
| 510-b | 517-d |
| 510-c | 517-c |
| 510-d | 517-e |
| 510-e | 517-b |
| 510-f | 517-b |
| 515-a | 517-c |
| 515-b | 517-g |
| 515-c | 517-g |
| 515-d | 517-h |
| 515-e | 517-a |
| 515-f | 517-d |

Accordingly, as described with reference to FIG. 5, the memory controller 315 may determine to establish a superblock (e.g., at 350) according to a second cursor. Superblocks associated with a second cursor may include a block 535 from a subset of the planes of the memory dice 505. That is, for exemplary purposes, the superblock may include a quantity of blocks 535 that is less than a total quantity of planes included in the memory die 505-*a* and the memory die 505-*b*. Moreover, at least one block (e.g., the block located at the row address 517-*f* in the plane 510-*a*) may be included in the second superblock due to a garbage collection operation being performed (e.g., at 342). That is, the block located at the row address 517-*f* in the plane 510-*a* may have been unavailable for selection (e.g., at 332) in a previously established superblock.

The blocks 535 may be included in another superblock associated with a second cursor (e.g., a non-performance cursor). As described herein, a superblock that is not associated with a performance cursor may include one block from a subset of the planes from one or more memory die 505. For example, a second superblock may include the blocks 535 listed in Table 2. Some of the blocks included in the superblock may have undergone a maintenance operation, and thus may not have been available blocks as illustrated with reference to FIG. 4.

TABLE 2

| Plane | Row |
|-------|-------|
| 510-a | 517-f |
| 510-b | 517-e |
| 510-c | NONE |
| 510-d | 517-a |
| 510-e | 517-d |
| 510-f | NONE |
| 515-a | 517-e |
| 515-b | 517-b |
| 515-c | 517-b |
| 515-d | NONE |
| 515-e | NONE |
| 515-f | 517-c |

Thus, as shown in Table 2, the second superblock may not include any blocks in the planes 510-*c*, 510-*f*, 515-*d*, or 515-*e*. Accordingly, when a write command is received from a host device, data may be written to each of the blocks of the second superblock concurrently. This may allow for relatively small write operations to occur, followed by periods when the memory device 500 is idle or when a cache (e.g., a cache associated with the memory device 500) is syncing. Moreover, the superblocks associated with the second cursor may allow for some planes to be skipped (e.g., planes 510-*c*, 510-*f*, 515-*d*, and 515-*e*.) so that wear leveling or other maintenance operations can be performed.

The host device 305 may transmit data 358 to the memory device 310. The memory controller 315 may transmit signaling 360 to the memory die 320-*a* and the memory die 320-*b*. In some examples, the signaling 360 may be transmitted by the memory controller 315 sequentially or concurrently and may be in response to receiving data from the host device 305 (e.g., at 358). The signaling 360 may include a command (e.g., a read command, a write command), a request, or another type of communication for writing data to the superblock.

For example, the signaling may include a write command for writing data to the second superblock associated with the memory die 320-*a* and the memory die 320-*b*. Thus if the superblock is associated with a first cursor, the data may be written to each block using a multi-plane write that accesses each plane of memory devices 320 concurrently such that portions of the data are stored in each block of the superblock. That is, the data may be spread across the blocks of the superblock. In other examples, if the superblock is associated with a second cursor, the data may be written to each block using a multi-plane write that accesses a subset of planes of the memory devices 320 concurrently. In either example (e.g., whether the superblock is associated with a first cursor or a second cursor), the data may be written evenly across each block of the superblock (e.g., a same number of pages in each block of the superblock).

In some examples, data may be written to the blocks such that each block is fully populated with data. For example, multiple write commands may be received from the host device and multiple write operations (e.g., multiple multi-plane write operations) may be performed on each of the blocks of the first superblock. After a quantity of write operations (e.g., a quantity greater than or equal to one (1)), the blocks of the superblock may be full. When the blocks of the superblock are full (e.g., fully populated), the memory controller may open a new cursor that corresponds to a new superblock. In some examples, maintenance operations may be performed one or more blocks of the first superblock after a new cursor (and subsequent superblock) is opened. By establishing and maintaining dynamic superblocks on the memory dice of the memory device 310, maintenance operations may be performed on some blocks, while still meeting performance requirements established by the host device 305.

Figure 6:
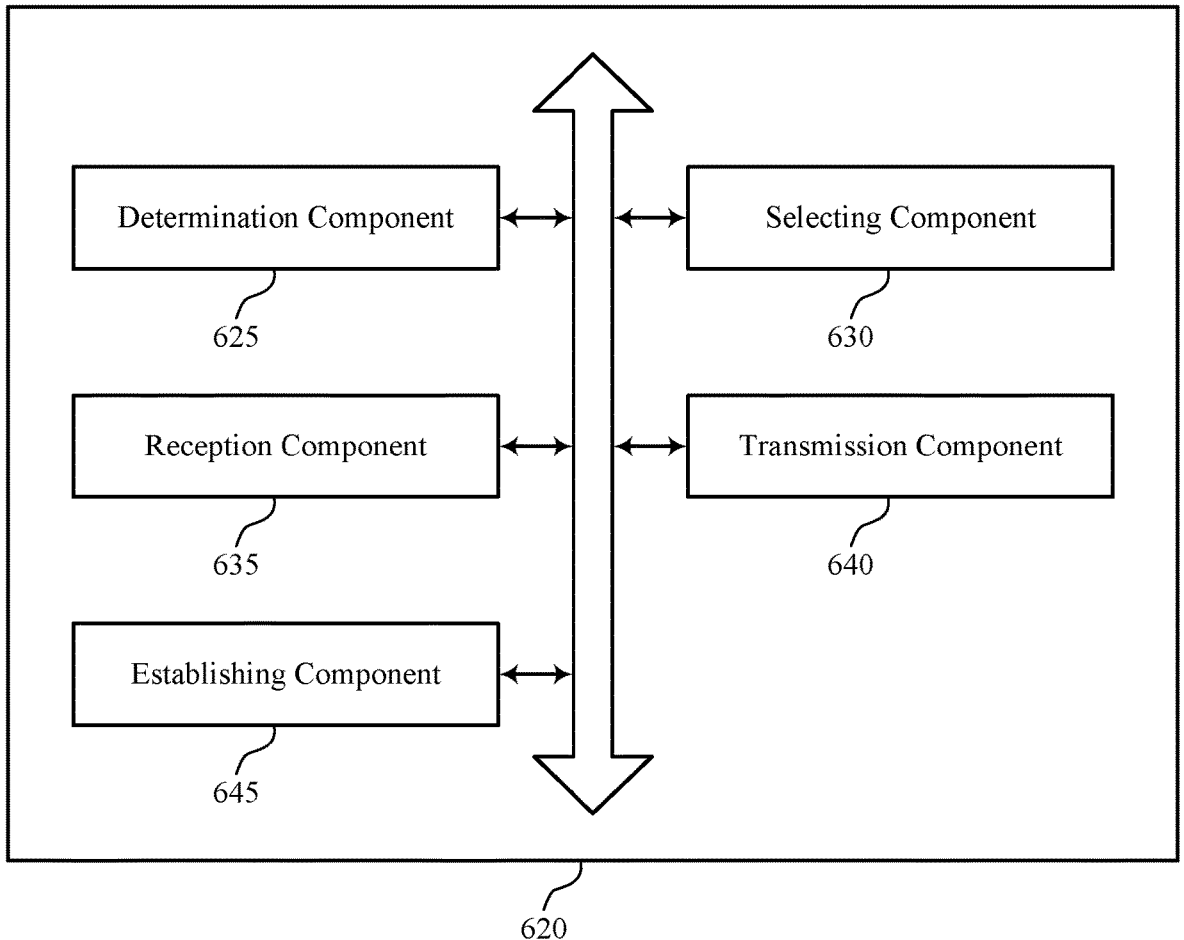
FIG. 6 shows a block diagram of a memory controller that supports dynamic superblocks in accordance with examples as disclosed herein.

FIG. 6 shows a block diagram 600 of a memory controller 620 that supports dynamic superblocks in accordance with examples as disclosed herein. The memory controller 620 may be an example of aspects of a memory controller as described with reference to FIGS. 1 through 5. The memory controller 620, or various components thereof, may be an example of means for performing various aspects of dynamic superblocks as described herein. For example, the memory controller 620 may include a determination component 625, a selecting component 630, a reception component 635, a transmission component 640, an establishing component 645, or any combination thereof. Each of these components may communicate, directly or indirectly, with one another (e.g., via one or more buses).

The determination component 625 may be configured as or otherwise support a means for determining, based at least in part on one or more commands received from a host device, to establish a superblock including a first set of two or more blocks of a memory including a plurality of planes, where the superblock is associated with multi-plane write operations for the memory. In some examples, to support selecting the respective block from each of the at least two of the plurality of planes for the superblock, the determination component 625 may be configured as or otherwise support a means for determining a quantity of available blocks within each plane. In some examples, to support selecting the respective block from each of the at least two of the plurality of planes for the superblock, the determination component 625 may be configured as or otherwise support a means for determining a quantity of access operations performed on available blocks within each plane.

The selecting component 630 may be configured as or otherwise support a means for selecting a respective block from each plane of at least two of the plurality of planes for the superblock based at least in part on determining to establish the superblock. In some examples, to support selecting the respective block from each of the at least two of the plurality of planes for the superblock, the selecting component 630 may be configured as or otherwise support a means for selecting a respective block from each plane that has a threshold quantity of available blocks. In some examples, to support selecting the respective block from each of the at least two of the plurality of planes for the superblock, the selecting component 630 may be configured as or otherwise support a means for refraining from selecting a block from a plane that does not include the threshold quantity of available blocks.

In some examples, to support selecting the respective block from each of the at least two of the plurality of planes for the superblock, the selecting component 630 may be configured as or otherwise support a means for selecting a respective block from each plane that fails to satisfy a threshold quantity of access operations performed. In some examples, the selecting component 630 may be configured as or otherwise support a means for selecting a respective block from each plane of the plurality of planes for the superblock based at least in part on receiving the indication of the performance requirement.

In some examples, the selecting component 630 may be configured as or otherwise support a means for selecting a first block that is associated with a first block address from a first plane of the plurality of planes for the write operation. In some examples, the selecting component 630 may be configured as or otherwise support a means for selecting a second block that is associated with a second block address from a second plane of the plurality of planes for the write operation, where the first block address is different than the second block address. In some examples, the selecting component 630 may be configured as or otherwise support a means for selecting, for the superblock, the first block that is associated with the first block address from the first plane of the plurality of planes, the second block that is associated with the second block address from the second plane of the plurality of planes, or both.

In some examples, the selecting component 630 may be configured as or otherwise support a means for the first superblock includes at least one block from a plane of a first memory die and at least one block from a plane of a second memory die. In some examples, the selecting component 630 may be configured as or otherwise support a means for the second superblock includes at least one block from each plane of the first memory die and at least one block from each plane of the second memory die.

In some examples, when selecting the first superblock for the first write operation, the selecting component 630 may be configured as or otherwise support a means for selecting the first block from the first plane based at least in part on the first plane including a threshold quantity of available blocks. In some examples, when selecting the first superblock for the first write operation, the selecting component 630 may be configured as or otherwise support a means for selecting the second block from the second plane based at least in part on the second plane including the threshold quantity of available blocks. In some examples, when selecting the first superblock for the first write operation, the selecting component 630 may be configured as or otherwise support a means for refraining from selecting a third block from a third plane based at least in part on the third plane not including the threshold quantity of available blocks.

The reception component 635 may be configured as or otherwise support a means for receiving, from the host device, data for writing to the memory. In some examples, the reception component 635 may be configured as or otherwise support a means for receiving an indication of a performance requirement for the data from the host device. In some examples, the reception component 635 may be configured as or otherwise support a means for receiving, subsequent to establishing the first superblock, the first data associated with the first performance level for writing to the memory. In some examples, the reception component 635 may be configured as or otherwise support a means for receiving, subsequent to establishing the second superblock, the second data associated with the second performance level for writing to the memory.

The transmission component 640 may be configured as or otherwise support a means for transmitting a command and the data to the memory, where the command indicates to write the data to the respective blocks of the superblock concurrently. In some examples, the transmission component 640 may be configured as or otherwise support a means for transmitting a second command and third data to the memory before determining to establish the superblock including the two or more blocks of the memory, where determining to establish the superblock including the two or more blocks of the memory is based at least in part on a completion of the third data being written to the memory. In some examples, the transmission component 640 may be configured as or otherwise support a means for transmitting, to the memory, a first command and first data for a first write operation to the first superblock and a second command and second data for a second write operation to the second superblock.

The establishing component 645 may be configured as or otherwise support a means for establishing a first superblock associated with a first performance level, the first superblock including a first block from a first plane of a plurality of planes of a memory and a second block from a second plane of the plurality of planes of the memory. In some examples, the establishing component 645 may be configured as or otherwise support a means for establishing a second superblock associated with a second performance level, the second superblock including a respective block from each plane of the plurality of planes of the memory. In some examples, the establishing component 645 may be configured as or otherwise support a means for establishing a third superblock associated with a first performance level, the third superblock including blocks that are exclusive of the first plane or the second plane.

Figure 7:
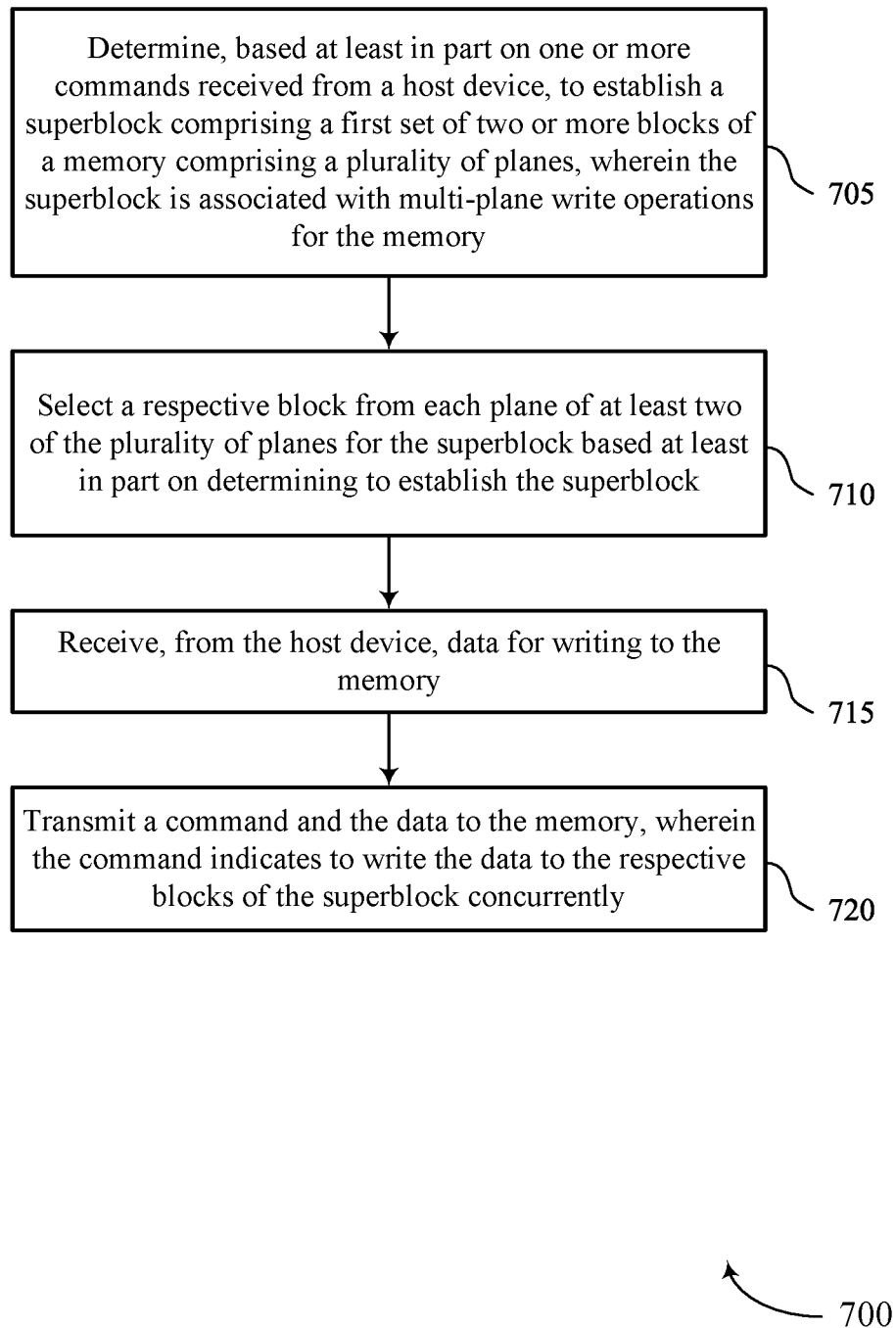
FIGS. 7 and 8 show flowcharts illustrating a method or methods that support dynamic superblocks in accordance with examples as disclosed herein.

FIG. 7 shows a flowchart illustrating a method 700 that supports dynamic superblocks in accordance with examples as disclosed herein. The operations of method 700 may be implemented by a memory controller or its components as described herein. For example, the operations of method 700 may be performed by a memory controller as described with reference to FIGS. 1 through 6. In some examples, a memory controller may execute a set of instructions to control the functional elements of the device to perform the described functions. Additionally or alternatively, the memory controller may perform aspects of the described functions using special-purpose hardware.

At 705, the method may include determining, based at least in part on one or more commands received from a host device, to establish a superblock including a first set of two or more blocks of a memory including a plurality of planes, where the superblock is associated with multi-plane write operations for the memory. The operations of 705 may be performed in accordance with examples as disclosed herein. In some examples, aspects of the operations of 705 may be performed by a determination component 625 as described with reference to FIG. 6.

At 710, the method may include selecting a respective block from each plane of at least two of the plurality of planes for the superblock based at least in part on determining to establish the superblock. The operations of 710 may be performed in accordance with examples as disclosed herein. In some examples, aspects of the operations of 710 may be performed by a selecting component 630 as described with reference to FIG. 6.

At 715, the method may include receiving, from the host device, data for writing to the memory. The operations of 715 may be performed in accordance with examples as disclosed herein. In some examples, aspects of the operations of 715 may be performed by a reception component 635 as described with reference to FIG. 6.

At 720, the method may include transmitting a command and the data to the memory, where the command indicates to write the data to the respective blocks of the superblock concurrently. The operations of 720 may be performed in accordance with examples as disclosed herein. In some examples, aspects of the operations of 720 may be performed by a transmission component 640 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for determining, based at least in part on one or more commands received from a host device, to establish a superblock including a first set of two or more blocks of a memory including a plurality of planes, where the superblock is associated with multi-plane write operations for the memory, selecting a respective block from each plane of at least two of the plurality of planes for the superblock based at least in part on determining to establish the superblock, receiving, from the host device, data for writing to the memory, and transmitting a command and the data to the memory, where the command indicates to write the data to the respective blocks of the superblock concurrently.

In some examples of the method 700 and the apparatus described herein, selecting the respective block from each of the at least two of the plurality of planes for the superblock may include operations, features, circuitry, logic, means, or instructions for determining a quantity of available blocks within each plane and selecting a respective block from each plane that may have a threshold quantity of available blocks.

In some examples of the method 700 and the apparatus described herein, selecting the respective block from each of the at least two of the plurality of planes for the superblock may include operations, features, circuitry, logic, means, or instructions for refraining from selecting a block from a plane that does not include the threshold quantity of available blocks.

In some examples of the method 700 and the apparatus described herein, selecting the respective block from each of the at least two of the plurality of planes for the superblock may include operations, features, circuitry, logic, means, or instructions for determining a quantity of access operations performed on available blocks within each plane and selecting a respective block from each plane that fails to satisfy a threshold quantity of access operations performed.

Some examples of the method 700 and the apparatus described herein may further include operations, features, circuitry, logic, means, or instructions for receiving an indication of a performance requirement for the data from the host device and selecting a respective block from each plane of the plurality of planes for the superblock based at least in part on receiving the indication of the performance requirement.

Some examples of the method 700 and the apparatus described herein may further include operations, features, circuitry, logic, means, or instructions for selecting a first block that may be associated with a first block address from a first plane of the plurality of planes for the write operation and selecting a second block that may be associated with a second block address from a second plane of the plurality of planes for the write operation, where the first block address may be different than the second block address.

Some examples of the method 700 and the apparatus described herein may further include operations, features, circuitry, logic, means, or instructions for determining, based at least in part on one or more additional commands received from the host device, to establish a second superblock including a second set of two or more blocks of the memory and selecting, for the superblock, the first block that may be associated with the first block address from the first plane of the plurality of planes, the second block that may be associated with the second block address from the second plane of the plurality of planes, or both.

Some examples of the method 700 and the apparatus described herein may further include operations, features, circuitry, logic, means, or instructions for transmitting a second command and third data to the memory before determining to establish the superblock including the two or more blocks of the memory, where determining to establish the superblock including the two or more blocks of the memory may be based at least in part on a completion of the third data being written to the memory.

Figure 8:
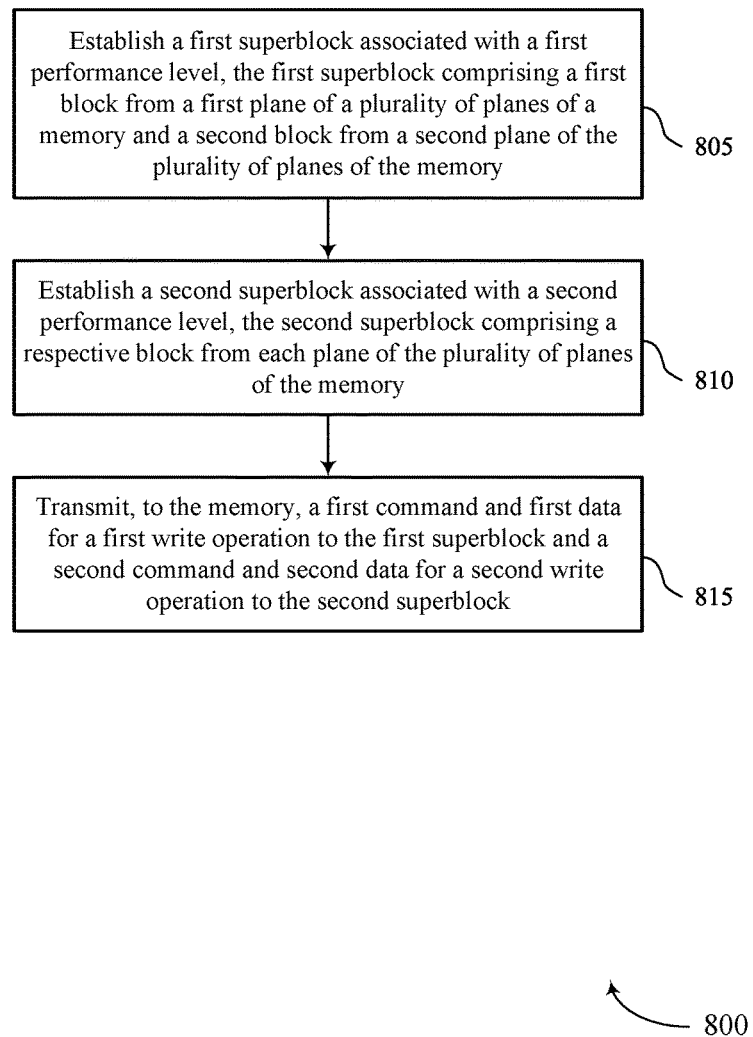

FIG. 8 shows a flowchart illustrating a method 800 that supports dynamic superblocks in accordance with examples as disclosed herein. The operations of method 800 may be implemented by a memory controller or its components as described herein. For example, the operations of method 800 may be performed by a memory controller as described with reference to FIGS. 1 through 6. In some examples, a memory controller may execute a set of instructions to control the functional elements of the device to perform the described functions. Additionally or alternatively, the memory controller may perform aspects of the described functions using special-purpose hardware.

At 805, the method may include establishing a first superblock associated with a first performance level, the first superblock including a first block from a first plane of a plurality of planes of a memory and a second block from a second plane of the plurality of planes of the memory. The operations of 805 may be performed in accordance with examples as disclosed herein. In some examples, aspects of the operations of 805 may be performed by an establishing component 645 as described with reference to FIG. 6.

At 810, the method may include establishing a second superblock associated with a second performance level, the second superblock including a respective block from each plane of the plurality of planes of the memory. The operations of 810 may be performed in accordance with examples as disclosed herein. In some examples, aspects of the operations of 810 may be performed by an establishing component 645 as described with reference to FIG. 6.

At 815, the method may include transmitting, to the memory, a first command and first data for a first write operation to the first superblock and a second command and second data for a second write operation to the second superblock. The operations of 815 may be performed in accordance with examples as disclosed herein. In some examples, aspects of the operations of 815 may be performed by a transmission component 640 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for establishing a first superblock associated with a first performance level, the first superblock including a first block from a first plane of a plurality of planes of a memory and a second block from a second plane of the plurality of planes of the memory, establishing a second superblock associated with a second performance level, the second superblock including a respective block from each plane of the plurality of planes of the memory, and transmitting, to the memory, a first command and first data for a first write operation to the first superblock and a second command and second data for a second write operation to the second superblock.

Some examples of the method 800 and the apparatus described herein may further include operations, features, circuitry, logic, means, or instructions for receiving, subsequent to establishing the first superblock, the first data associated with the first performance level for writing to the memory and receiving, subsequent to establishing the second superblock, the second data associated with the second performance level for writing to the memory.

Some examples of the method 800 and the apparatus described herein may further include operations, features, circuitry, logic, means, or instructions for establishing a third superblock associated with a first performance level, the third superblock including blocks that may be exclusive of the first plane or the second plane.

In some examples of the method 800 and the apparatus described herein, the second write operation includes a sequential write operation.

In some examples of the method 800 and the apparatus described herein, and the method, apparatuses, and non-transitory computer-readable medium may include further operations, features, circuitry, logic, means, or instructions for the first superblock includes at least one block from a plane of a first memory die and at least one block from a plane of a second memory die and the second superblock includes at least one block from each plane of the first memory die and at least one block from each plane of the second memory die.

In some examples of the method 800 and the apparatus described herein, selecting the first superblock for the first write operation may include operations, features, circuitry, logic, means, or instructions for determining a quantity of available blocks within each plane, selecting the first block from the first plane based at least in part on the first plane including a threshold quantity of available blocks, selecting the second block from the second plane based at least in part on the second plane including the threshold quantity of available blocks, and refraining from selecting a third block from a third plane based at least in part on the third plane not including the threshold quantity of available blocks.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory including a plurality of planes that each include a plurality of blocks that each include a plurality of non-volatile memory cells, a controller coupled with the memory and operable to, determine, based at least in part on one or more commands received from a host device, to establish a superblock including a first set of two or more blocks of the memory, where the superblock is associated with multi-plane write operations for the memory, select, for the superblock, a respective block from each plane of at least two of the plurality of planes based at least in part on determining to establish the superblock, receive, from the host device, data for writing to the memory, and transmit a command and the data to the memory, where the command indicates to write the data to the respective blocks of the superblock concurrently In some examples, the apparatus may include determine a quantity of available blocks within each plane and select a respective block from each plane that may have a threshold quantity of available blocks.

In some examples, the apparatus may include refrain from selecting a block from a plane that does not include the threshold quantity of available blocks.

In some examples, the apparatus may include determine a quantity of access operations performed on available blocks within each plane and select a respective block from each plane that fails to satisfy a threshold quantity of access operations performed.

In some examples, the apparatus may include receive an indication of a performance requirement for the data from the host device and select a respective block from each plane of the plurality of planes for the superblock based at least in part on receiving the indication of the performance requirement.

In some examples, the apparatus may include select a first block that may be associated with a first block address from a first plane of the plurality of planes for the write operation and select a second block that may be associated with a second block address from a second plane of the plurality of planes for the write operation, where the first block address may be different than the second block address.

In some examples, the apparatus may include determine, based at least in part on one or more additional commands received from the host device, to establish a second superblock including two or more blocks of the memory and select, for the superblock, the first block that may be associated with the first block address from the first plane of the plurality of planes, the second block that may be associated with the second block address from the second plane of the plurality of planes, or both.

In some examples, the apparatus may include transmit a second command and third data to the memory before determining to establish the superblock including the two or more blocks of the memory, where determining to establish the superblock including the two or more blocks of the memory may be based at least in part on a completion of the third data being written to the memory.

In some examples of the apparatus, the memory includes a plurality of memory die, and the superblock includes at least one block from a plane of a first memory die of the plurality of memory die and at least one block from a plane of a second memory die of the plurality of memory die.

In some examples, the apparatus may include transmitting a first portion of the data for writing to a first block of the superblock and transmitting a second portion of the data for writing to a second block of the superblock, where the first portion and the second portion include a same quantity of data.

In some examples, the apparatus may include perform one or more maintenance operations on at least a third block from one of the plurality of planes, where the third block may be included in the superblock and the one or more maintenance operations include erasing the third block, determine, based at least in part on one or more additional commands received from the host device, to establish a second superblock including a second set of two or more blocks of the memory after transmitting the data and the command for the superblock, and select a respective block from at least two of the plurality of planes for the second superblock based at least in part on determining to establish the second superblock, where the third block may be included in the second superblock.

Another apparatus is described. The apparatus may include a memory including a plurality of planes, where each plane includes a plurality of blocks that each include a plurality of non-volatile memory cells, a controller coupled with the memory, where the controller is operable to, establish a first superblock associated with a first performance level, the first superblock including a first block from a first plane of the plurality of planes of the memory and a second block from a second plane of the plurality of planes of the memory, establish a second superblock associated with a second performance level, the second superblock including a respective block from each plane of the plurality of planes of the memory, and transmit, to the memory, a first command and first data for a first write operation to the first superblock and a second command and second data for a second write operation to the second superblock In some examples, the apparatus may include receive, subsequent to establishing the first superblock, the first data associated with the first performance level for writing to the memory and receive, subsequent to establishing the second superblock, the second data associated with the second performance level for writing to the memory.

In some examples, the apparatus may include establish a third superblock associated with a first performance level, the third superblock including blocks that may be exclusive of the first plane or the second plane.

In some examples of the apparatus, the second write operation includes a sequential write operation.

In some examples of the apparatus, the first superblock includes at least one block from a plane of a first memory die and at least one block from a plane of a second memory die and the second superblock includes at least one block from each plane of the first memory die and at least one block from each plane of the second memory die.

In some examples, the apparatus may include determine a quantity of available blocks within each plane, select the first block from the first plane based at least in part on the first plane including a threshold quantity of available blocks, select the second block from the second plane based at least in part on the second plane including the threshold quantity of available blocks, and refrain from selecting a third block from a third plane based at least in part on the third plane not including the threshold quantity of available blocks.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory comprising a plurality of planes that each comprise a plurality of blocks that each include a plurality of non-volatile memory cells; and
    a controller coupled with the memory and operable to:
        determine, based at least in part on one or more commands received from a host device, to establish a superblock comprising a first set of two or more blocks of the memory, wherein the superblock is associated with multi-plane write operations for the memory;
        select, for the superblock, a respective block from each plane of at least two of the plurality of planes that fails to satisfy a threshold quantity of access operations performed based at least in part on determining to establish the superblock;
        receive, from the host device, data for writing to the memory; and
        transmit a command and the data to the memory, wherein the command indicates to write the data to the respective blocks of the superblock concurrently.

2. The apparatus of claim 1, wherein, to select the respective block from each of the at least two of the plurality of planes for the superblock, the controller is operable to:
    determine a quantity of available blocks within each plane; and
    select a respective block from each plane that has a threshold quantity of available blocks.

3. The apparatus of claim 2, wherein, to select the respective block from each of the at least two of the plurality of planes for the superblock, the controller is operable to:
    refrain from selecting a block from a plane that does not include the threshold quantity of available blocks.

4. The apparatus of claim 1, wherein the controller is operable to:
    determine a quantity of access operations performed on available blocks within each plane.

5. The apparatus of claim 1, wherein the controller is operable to:
    receive an indication of a performance requirement for the data from the host device; and
    select a respective block from each plane of the plurality of planes for the superblock based at least in part on receiving the indication of the performance requirement.

6. The apparatus of claim 1, wherein, to select the respective block from each of the at least two of the plurality of planes for the superblock, the controller is operable to:
    select a first block that is associated with a first block address from a first plane of the plurality of planes for writing the data; and
    select a second block that is associated with a second block address from a second plane of the plurality of planes for writing the data, wherein the first block address is different than the second block address.

7. The apparatus of claim 6, wherein the controller is operable to:
    determine, based at least in part on one or more additional commands received from the host device, to establish a second superblock comprising two or more blocks of the memory; and
    select, for the superblock, the first block that is associated with the first block address from the first plane of the plurality of planes, the second block that is associated with the second block address from the second plane of the plurality of planes, or both.

8. The apparatus of claim 1, wherein the controller is operable to:
    transmit a second command and third data to the memory before determining to establish the superblock comprising the two or more blocks of the memory, wherein determining to establish the superblock comprising the two or more blocks of the memory is based at least in part on a completion of the third data being written to the memory.

9. The apparatus of claim 1, wherein:
the memory comprises a plurality of memory die, and
the superblock comprises at least one block from a plane of a first memory die of the plurality of memory die and at least one block from a plane of a second memory die of the plurality of memory die.

10. The apparatus of claim 1, wherein transmitting the data to the memory comprises:
transmitting a first portion of the data for writing to a first block of the superblock; and
transmitting a second portion of the data for writing to a second block of the superblock, wherein the first portion and the second portion comprise a same quantity of data.

11. The apparatus of claim 1, wherein the controller is operable to:
perform one or more maintenance operations on at least a third block from one of the plurality of planes, wherein the third block is included in the superblock and the one or more maintenance operations comprise erasing the third block;
determine, based at least in part on one or more additional commands received from the host device, to establish a second superblock comprising a second set of two or more blocks of the memory after transmitting the data and the command for the superblock; and
select a respective block from at least two of the plurality of planes for the second superblock based at least in part on determining to establish the second superblock, wherein the third block is included in the second superblock.

12. An apparatus, comprising:
a memory comprising a plurality of planes, wherein each plane comprises a plurality of blocks that each include a plurality of non-volatile memory cells; and
a controller coupled with the memory, wherein the controller is operable to:
receive a performance criteria from a host system;
establish a first superblock associated with a first performance level, the first superblock comprising a first block from a first plane of the plurality of planes of the memory and a second block from a second plane of the plurality of planes of the memory based at least in part on receiving the performance criteria;
establish a second superblock associated with a second performance level, the second superblock comprising a respective block from each plane of the plurality of planes of the memory based at least in part on receiving the performance criteria; and
transmit, to the memory, a first command and first data for a first write operation to the first superblock and a second command and second data for a second write operation to the second superblock.

13. The apparatus of claim 12, wherein the controller is operable to:
receive, subsequent to establishing the first superblock, the first data associated with the first performance level for writing to the memory; and
receive, subsequent to establishing the second superblock, the second data associated with the second performance level for writing to the memory.

14. The apparatus of claim 12, wherein the controller is operable to:
establish a third superblock associated with a first performance level, the third superblock comprising blocks that are exclusive of the first plane or the second plane.

15. The apparatus of claim 14, wherein the second write operation comprises a sequential write operation.

16. The apparatus of claim 12, wherein the memory comprises a plurality of memory die, wherein:
the first superblock comprises at least one block from a plane of a first memory die and at least one block from a plane of a second memory die; and
the second superblock comprises at least one block from each plane of the first memory die and at least one block from each plane of the second memory die.

17. The apparatus of claim 12, wherein, to select the first superblock for the first write operation, the controller is operable to:
determine a quantity of available blocks within each plane;
select the first block from the first plane based at least in part on the first plane including a threshold quantity of available blocks;
select the second block from the second plane based at least in part on the second plane including the threshold quantity of available blocks; and
refrain from selecting a third block from a third plane based at least in part on the third plane not including the threshold quantity of available blocks.

18. A non-transitory computer-readable medium storing code comprising instructions which, when executed by a processor of a memory device, cause the memory device to:
determine, based at least in part on one or more commands received from a host device, to establish a superblock comprising a first set of two or more blocks of a memory comprising a plurality of planes, wherein the superblock is associated with multi-plane write operations for the memory;
select a respective block from each plane of at least two of the plurality of planes for the superblock that fails to satisfy a threshold quantity of access operations performed based at least in part on determining to establish the superblock;
receive, from the host device, data for writing to the memory; and
transmit a command and the data to the memory, wherein the command indicates to write the data to the respective blocks of the superblock concurrently.

19. The non-transitory computer-readable medium of claim 18, wherein to select the respective block from each of the at least two of the plurality of planes for the superblock, the instructions, when executed by the processor of the memory device, further cause the memory device to:
determine a quantity of available blocks within each plane; and
select a respective block from each plane that has a threshold quantity of available blocks.

20. The non-transitory computer-readable medium of claim 19, wherein to select the respective block from each of the at least two of the plurality of planes for the superblock, the instructions, when executed by the processor of the memory device, further cause the memory device to:
refrain from selecting a block from a plane that does not include the threshold quantity of available blocks.

21. The non-transitory computer-readable medium of claim 18, the instructions, when executed by the processor of the memory device, further cause the memory device to:
determine a quantity of access operations performed on available blocks within each plane.

22. The non-transitory computer-readable medium of claim 18, wherein the instructions, when executed by the processor of the memory device, further cause the memory device to:
- receive an indication of a performance requirement for the data from the host device; and
- select a respective block from each plane of the plurality of planes for the superblock based at least in part on receiving the indication of the performance requirement.

23. The non-transitory computer-readable medium of claim 18, wherein the instructions, when executed by the processor of the memory device, further cause the memory device to:
- select a first block that is associated with a first block address from a first plane of the plurality of planes for writing the data; and
- select a second block that is associated with a second block address from a second plane of the plurality of planes for writing the data, wherein the first block address is different than the second block address.

24. The non-transitory computer-readable medium of claim 23, wherein the instructions, when executed by the processor of the memory device, further cause the memory device to:
- determine, based at least in part on one or more additional commands received from the host device, to establish a second superblock comprising a second set of two or more blocks of the memory; and
- select, for the superblock, the first block that is associated with the first block address from the first plane of the plurality of planes, the second block that is associated with the second block address from the second plane of the plurality of planes, or both.

25. The non-transitory computer-readable medium of claim 18, wherein the instructions, when executed by the processor of the memory device, further cause the memory device to:
- transmit a second command and third data to the memory before determining to establish the superblock comprising the two or more blocks of the memory, wherein determining to establish the superblock comprising the two or more blocks of the memory is based at least in part on a completion of the third data being written to the memory.

* * * * *